(12) United States Patent
Matsui

(10) Patent No.: US 8,245,992 B2
(45) Date of Patent: Aug. 21, 2012

(54) HANGER AND DISPLAY

(75) Inventor: Hitoshi Matsui, Hokkaido (JP)

(73) Assignee: Panasonic Corporation, Osaka (JP)

(*) Notice: Subject to any disclaimer, the term of this patent is extended or adjusted under 35 U.S.C. 154(b) by 400 days.

(21) Appl. No.: 11/855,488

(22) Filed: Sep. 14, 2007

(65) Prior Publication Data

US 2008/0083865 A1    Apr. 10, 2008

(30) Foreign Application Priority Data

Sep. 15, 2006  (JP) .................................. 2006-251429

(51) Int. Cl.
*A47H 1/10* (2006.01)

(52) U.S. Cl. .................... 248/317; 248/224.51

(58) Field of Classification Search .................. 248/317, 248/917, 918, 489, 497, 224.51, 223.41, 248/224.8, 222.41; 211/86.01, 87.01, 192, 211/106.01, 70.6, 94.01, 90.02; 40/757, 40/759

See application file for complete search history.

(56) References Cited

U.S. PATENT DOCUMENTS

| | | | | |
|---|---|---|---|---|
| 2,965,339 A * | 12/1960 | Denton | .......................... | 248/495 |
| 4,094,415 A * | 6/1978 | Larson | .......................... | 211/57.1 |
| 4,602,756 A * | 7/1986 | Chatfield | .................. | 248/223.41 |
| 4,883,247 A * | 11/1989 | Crandall | ........................ | 248/542 |
| 5,110,080 A * | 5/1992 | Rieman | ..................... | 248/225.11 |
| 6,719,260 B1 * | 4/2004 | Hart | ................................ | 248/479 |
| 7,097,143 B2 * | 8/2006 | Kim et al. | ..................... | 248/201 |
| 7,611,109 B2 * | 11/2009 | Lin | .......................... | 248/222.52 |
| 7,661,640 B2 * | 2/2010 | Persson | .................... | 248/225.11 |
| 2004/0232298 A1 * | 11/2004 | Bremmon et al. | ........ | 248/281.11 |
| 2005/0152102 A1 * | 7/2005 | Shin | ............................... | 361/681 |
| 2008/0179265 A1 * | 7/2008 | Lin | ................................ | 211/70.6 |
| 2008/0237434 A1 * | 10/2008 | Lin | ................................ | 248/497 |

FOREIGN PATENT DOCUMENTS

JP           11-201386        7/1999

* cited by examiner

*Primary Examiner* — A. Joseph Wujciak, III
(74) *Attorney, Agent, or Firm* — Hamre, Schumann, Mueller & Larson, P.C.

(57) ABSTRACT

A hanger that enables an easy alignment at the time of hanging a display main body on a wall, and a display including the same are provided. The hanger includes a projecting portion that is attached to a rear surface of the display main body, and a support member that is fixed to a wall surface and connected to the projecting portion so as to support the display main body. The projecting portion includes a shaft that sticks out from the rear surface and a stopper that is attached to a tip of the shaft. The support member includes a connector to be connected to the projecting portion and a temporary holder on which the projecting portion is placed temporarily before the projecting portion and the connector are connected. The temporary holder is located at a position adjacent to the connector and formed so as to be caught between the stopper and the rear surface when the projecting portion is placed temporarily.

8 Claims, 15 Drawing Sheets

HANGER AND DISPLAY

BACKGROUND OF THE INVENTION

1. Field of the Invention

The present invention relates to a hanger for hanging a main body of a display such as a plasma television and a liquid crystal television, and a display including the same.

2. Description of Related Art

Recently, in the field of a television receiver (hereinafter referred to as a "television"), a rapid generation shift from a CRT television to a thin display television such as a plasma television and a liquid crystal television has been taking place. The thin display television is literally thinner and lighter than the CRT television. With these features, the thin display television not only is placed on a television stand similarly to the conventional CRT television, but also is hung on a wall in some cases (see for example, JP 11(1999)-201386A.

Hereinafter, the case of hanging the thin display television on a wall will be described with reference to FIG. 15. FIG. 15 is a perspective view showing a conventional hanger. As shown in FIG. 15, two projecting portions 106 are attached to a rear surface 101b of a main body (a television main body) 101 of the thin display television. The projecting portion 106 includes a shaft 107 that sticks out from the rear surface 101b and a stopper 108 that is attached to a tip of the shaft 107 and has a larger diameter than the shaft 107. Reference numeral 101a denotes a display screen of the television main body 101.

Furthermore, two jigs 103 that are used for wall-hanging are fixed to a wall surface 100 so as to correspond to the respective projecting portions 106. A set of the jigs 103 and the projecting portions 106 constitutes the hanger for hanging the television main body 101 on the wall. The two jigs 103 are fixed to the wall surface 100 by attaching these jigs 103 to a securing plate 102 in the state where they are positioned and then fixing this securing plate 102 to the wall surface 100, for example, with screws.

In addition, each of the jigs 103 is formed by bending a strip-like metal plate several times along its short sides, so that a center portion thereof projects out. Furthermore, the center portion of the jig 103 has a step-like notch 104. This notch 104 is formed so as to be able to engage with the shaft 107 of the projecting portion 106. Moreover, the jig is fixed to the wall surface 100 so that an opening 105 of the notch 104 is oriented upward.

Accordingly, the shafts 107 are aligned with the notches 104 so that each of the shafts 107 is located in the vicinity of the opening 105 of the notch 104, and then guided further to the bottom of the notch 104, whereby the television main body 101 can be hung on the wall. In the example of FIG. 15, even when the television main body 101 is subjected to a force that pushes it up, it will not come off owing to the step-like shape of the notch 104. According to the example shown in FIG. 15, the television main body 101 can be secured easily and firmly.

On the other hand, in the example shown in FIG. 15, since the projecting portions 106 and the jigs 103 are not easily visible during the wall-hanging operation, the shafts 107 and the notches 104 have to be aligned by groping while shifting the television main body 101 little by little. Furthermore, the operator needs to make such alignment while holding the television main body, and this puts a heavy burden upon the operator. Moreover, this operation becomes more difficult with an increase in the screen size of the thin display television. With this being the situation, conventionally, there have been demands for an easier wall-hanging operation.

SUMMARY OF THE INVENTION

It is an object of the present invention to solve the problems described above and to provide a hanger that enables an easy alignment at the time of hanging a display main body on a wall, and a display including the same.

In order to achieve the above-mentioned object, a hanger according to the present invention is a hanger for hanging a display main body on a wall, including a projecting portion that is attached to a rear surface of the display main body, and a support member that is fixed to a wall surface and connected to the projecting portion so as to support the display main body. The projecting portion includes a shaft that sticks out from the rear surface and a stopper that is attached to a tip of the shaft, and the stopper is formed to have a larger cross-section than the shaft. The support member includes a connector to be connected to the projecting portion and a temporary holder on which the projecting portion is placed temporarily before the projecting portion and the connector are connected. The temporary holder is located at a position adjacent to the connector and formed so as to be caught between the stopper and the rear surface when the projecting portion is placed temporarily.

Further, in order to achieve the above-mentioned object, a display according to the present invention includes a display main body, and a hanger for hanging the display main body on a wall. The hanger includes a projecting portion that is attached to a rear surface of the display main body, and a support member that is fixed to a wall surface and connected to the projecting portion so as to support the display main body. The projecting portion includes a shaft that sticks out from the rear surface and a stopper that is attached to a tip of the shaft, and the stopper is formed to have a larger cross-section than the shaft. The support member includes a connector to be connected to the projecting portion and a temporary holder on which the projecting portion is placed temporarily before the projecting portion and the connector are connected. The temporary holder is located at a position adjacent to the connector and formed so as to be caught between the stopper and the rear surface when the projecting portion is placed temporarily.

In accordance with the present invention, at a position adjacent to that in which the projecting portion attached to the main body of the display (the display main body) and the support member are to be connected, the projecting portion can be placed temporarily on the support member. At this time, part of the support member is caught between the stopper of the projecting portion and the display main body. Thus, the display main body is held stably, so that a heavy burden is not put upon the operator. Consequently, compared with the conventional case, it is easier to align the projecting portion and the support member, resulting in an easier wall-hanging operation of the display main body.

DETAILED DESCRIPTION OF THE INVENTION

Figure 1:
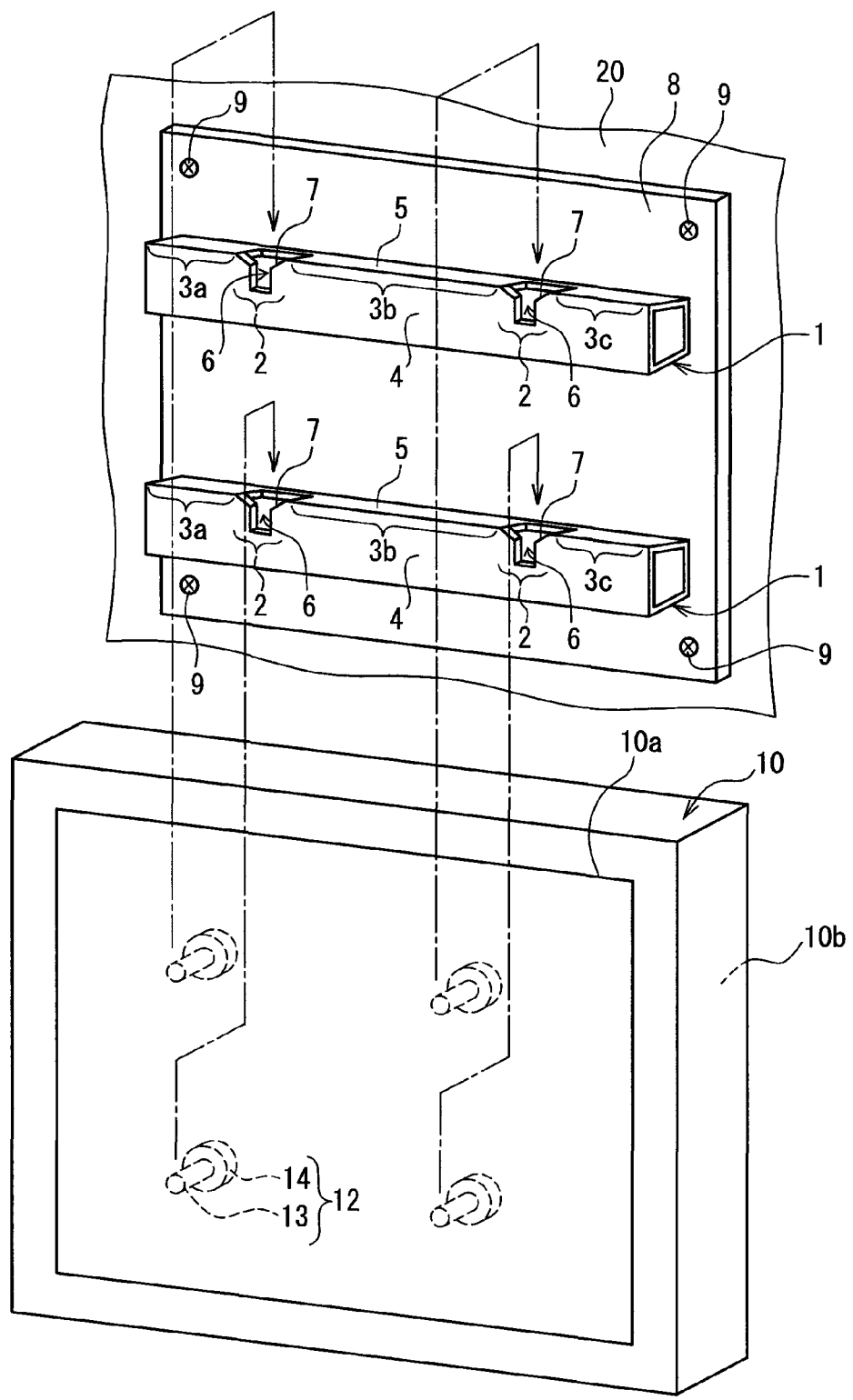
FIG. 1 is a perspective view showing the structure of a hanger and a display according to Embodiment 1 of the present invention.

A hanger according to the present invention is a hanger for hanging a display main body on a wall, including a projecting portion that is attached to a rear surface of the display main body, and a support member that is fixed to a wall surface and connected to the projecting portion so as to support the display main body. The projecting portion includes a shaft that sticks out from the rear surface and a stopper that is attached to a tip of the shaft, and the stopper is formed to have a larger cross-section than the shaft. The support member includes a connector to be connected to the projecting portion and a temporary holder on which the projecting portion is placed temporarily before the projecting portion and the connector are connected. The temporary holder is located at a position adjacent to the connector and formed so as to be caught between the stopper and the rear surface when the projecting portion is placed temporarily.

Also, a display according to the present invention includes a display main body, and a hanger for hanging the display main body on a wall. The hanger includes a projecting portion that is attached to a rear surface of the display main body, and a support member that is fixed to a wall surface and connected to the projecting portion. The projecting portion includes a shaft that sticks out from the rear surface and a stopper that is attached to a tip of the shaft, and the stopper is formed to have a larger cross-section than the shaft. The support member includes a connector to be connected to the projecting portion and a temporary holder on which the projecting portion is placed temporarily before the projecting portion and the connector are connected. The temporary holder is located at a position adjacent to the connector and formed so as to be caught between the stopper and the rear surface when the projecting portion is placed temporarily.

In the hanger and the display of the present invention described above, the support member can be provided with a notch that serves as the connector. The notch can be formed so that its opening is oriented upward when the support member is fixed to the wall surface and so that, when the shaft is fitted into the notch, the stopper is hooked on a periphery of the notch, thereby restricting a movement of the display main body in a normal direction of the wall surface. This makes it possible to connect the projecting portion and the support member reliably with a simple structure.

In the above mode, an end portion on a side provided with the opening of the notch also can constitute the temporary holder. In this case, it is preferable that the length from an edge of the opening of the notch to an edge of the end portion constituting the temporary holder is set to be at least 1/10 times as large as a horizontal length of a display screen of the display.

Further, in the hanger and the display of the present invention described above, the temporary holder can include a first surface and a second surface that meet so as to form an acute angle. The first surface can be located so as to face the display main body when the support member is fixed to the wall surface. The second surface can be located between the first surface and the wall surface when the support member is fixed to the wall surface, and contact and support the stopper. A portion where the first surface and the second surface meet can be caught between the stopper and the rear surface.

With this mode, the second surface forms an oblique surface inclined toward the wall surface. Thus, when the stopper of the display main body is placed temporarily, it tends to fall along the oblique surface toward the lower side thereof, so that dropping of the display main body to the side opposite from the oblique surface is suppressed. Further, in the case where the display main body is moved horizontally after the temporary placing, the stopper constantly tends to fall toward the lower side of the oblique surface until the temporary holder is fitted between the rear surface and the stopper. Accordingly, it also is possible to prevent the display main body from dropping at the time of alignment after the temporary placing. Incidentally, the stopper may rotate like a roller. In this case, the dropping of the display main body also is suppressed.

Moreover, in the hanger and the display of the present invention described above, the temporary holder can include a plate-like protruding portion and a retaining portion that retains the stopper. The plate-like protruding portion can be formed so that its end portion is caught between the stopper and the rear surface. The retaining portion can include a surface that contacts the stopper.

With this mode, when the stopper of the display is placed temporarily on the protruding portion, the protruding portion is caught between the stopper and the rear surface. Consequently, the display main body does not drop off even when it is subjected to a force along a back-and-forth direction perpendicular to a display surface, thus allowing alignment with the temporary placing to be performed reliably.

Embodiment 1

Figure 2:
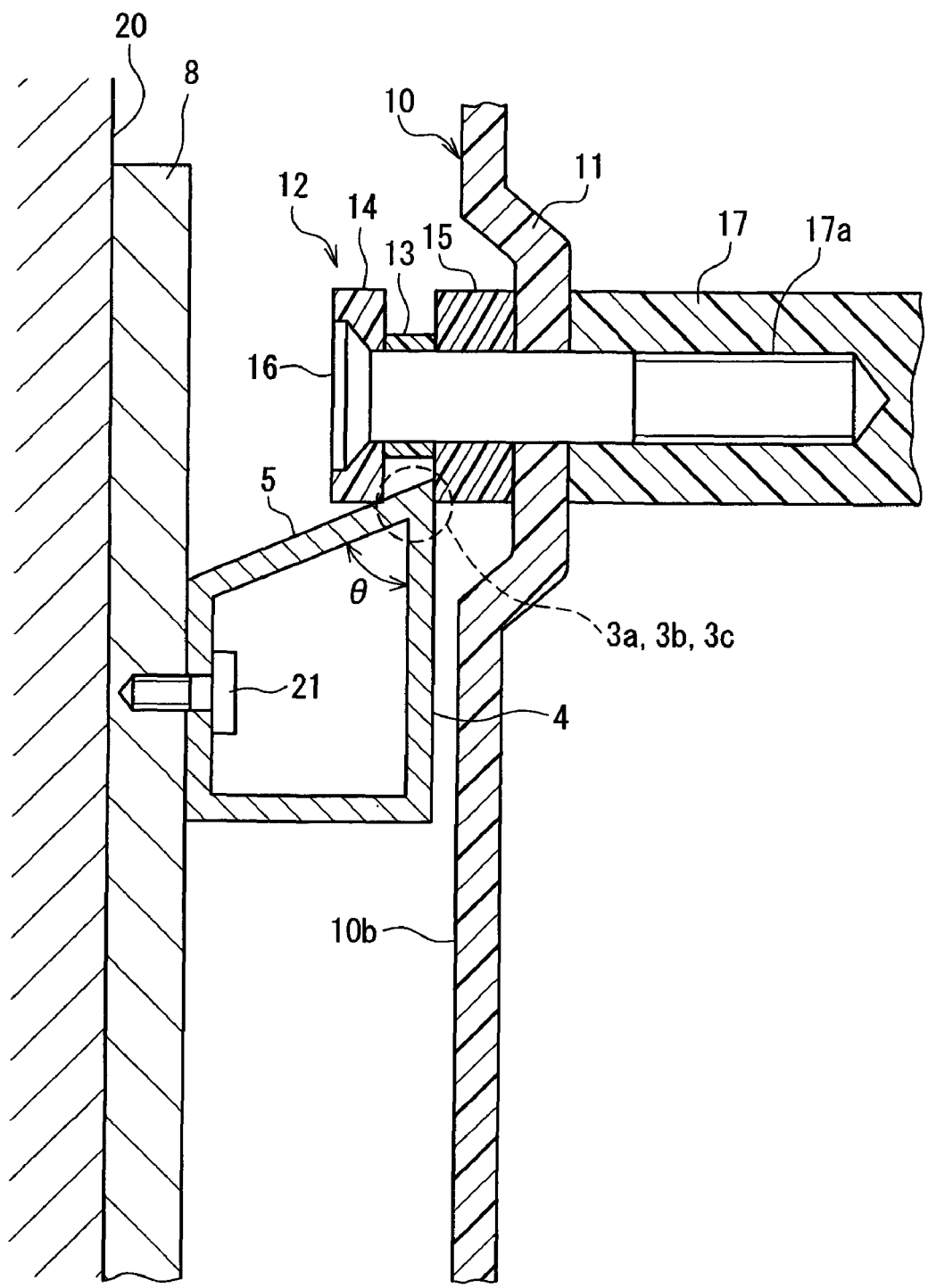
FIG. 2 is a cross-sectional view showing the structure of the hanger shown in FIG. 1.

The following is a description of a hanger and a display according to Embodiment 1 of the present invention with reference to FIGS. 1 to 6. First, the structure of the hanger according to Embodiment 1 of the present invention will be described with reference to FIGS. 1 and 2. FIG. 1 is a perspective view showing the structure of the hanger and the display according to Embodiment 1 of the present invention. FIG. 2 is a cross-sectional view showing the structure of the hanger shown in FIG. 1. Furthermore, FIG. 2 shows the state in which a display main body 10 is placed temporarily on a support member 1.

As shown in FIG. 1, the hanger is used for hanging the display main body 10 on the wall, and includes projecting portions 12 that are mounted on a surface 10b (a rear surface) of the display main body 10 opposite to a display screen 10a, and the support members 1 connected to the projecting portions 12. This hanger and the display main body 10 constitute the display according to Embodiment 1 of the present invention. Furthermore, the support members 1 of the hanger are mounted on a wall surface 20 via a securing plate 8.

The projecting portion 12 includes a shaft 13 that sticks out from the rear surface 10b and a stopper 14 attached to a tip of the shaft 13. The stopper 14 is formed to have a larger cross-section than the shaft 13. The support member 1 includes a longitudinal bar with connectors 2 to be connected with the projecting portions 12, and temporary holders 3a to 3c.

The temporary holders 3a to 3c are located at positions adjacent to the connectors 2 and used for temporarily placing the projecting portions 12 before connecting the projecting portions 12 with the connectors 2. Furthermore, as described later, the temporary holders 3a to 3c are formed so as to be caught between the stoppers 14 and the rear surface 10b when the projecting portions 12 are placed temporarily.

In Embodiment 1 of the present invention, the display is a thin television receiver such as a plasma television or a liquid crystal television, and the display main body refers to a main body of the display, namely, part including a display panel. The display may be the one that has no television function and is used only as a monitor.

In Embodiment 1 of the present invention, two support members 1 are used, each provided with a longitudinal bar having two connectors 2. As shown in FIG. 2, these support members 1 are secured to the securing plate 8 with screws 21. The securing plate 8 defines a positional relationship between the support members and the screws. Furthermore, these support members 1 are fixed to a wall surface 20 via the securing plate 8, which is attached to the wall surface 20 with screws 9.

Furthermore, in Embodiment 1 of the present invention, four projecting portions 12 are correspondingly attached to the respective connectors 2 of the two support members 1. Each of the projecting portions 12 has the stopper 14 and the shaft 13 that are provided rotatably, thereby allowing easy positioning after temporarily placing.

More specifically, as shown in FIG. 2, the shaft 13 is configured by a columnar member, and the stopper 14 is configured by a disk-shaped member having an aperture at its center. Inner portions of the stopper 14 and the shaft 13 are penetrated by a countersunk bolt 16, and the stopper 14 and the shaft 13 are attached to the display main body 10 with the countersunk bolt 16.

The countersunk bolt 16 penetrates a side wall 11 that forms the rear surface 10b of the display main body 10 and engages with a female thread in a thread hole 17a formed inside a columnar member 17. However, since a male thread is provided only in a tip portion of the countersunk bolt 16, the stopper 14 and the shaft 13 can rotate about the countersunk bolt 16. In addition, reference numeral 15 in FIG. 2 denotes a collar used for adjusting the positions of the shaft 13 and the stopper 14. The columnar member 17 is fixed to an inner frame (not shown) of the display main body 10.

In Embodiment 1 of the present invention, the support member 1 has a substantially prismatic shape. More specifically, a cross-section of the support member 1 exhibits a trapezoid frame (see FIG. 2). Furthermore, the support member 1 has a notch 6, which serves as the connector 2. The notch 6 is formed in a surface (a first surface) 4 that faces the display main body 10 when the support member 1 is fixed to the wall surface 20 such that its opening 7 is oriented upward.

In addition, the notch 6 is formed so that, in the case where the shaft 13 is fitted into the notch 6, the stopper 14 is hooked on the first surface 4 when the display main body 10 slides away from the wall surface 20 in a normal direction thereof. In other words, the notch 6 is formed so that the width of its portion formed in the first surface 4 is larger than an outer diameter of the shaft 13 but smaller than that of the stopper 14. With this structure, by fitting the shaft 13 of each of the projecting portions 12 into the corresponding notch 6, the display main body 10 can be hung on the wall surface 20 via the support member 1. Accordingly, even when some force is exerted on the display main body 10 in a direction away from the wall surface 20, the stopper 14 being hooked on the first surface 4 of the support member 1 prevents the display main body 10 from coming off from the hanger and falling down. Therefore, safety of an operator and an observer can be secured.

Furthermore, as shown in FIGS. 1 and 2, a surface (a second surface) 5 that is located between the first surface 4 and the wall surface 20 and faces upward when the support member 1 is fixed to the wall surface 20 forms an oblique surface inclined toward the wall surface 20. In other words, the first surface 4 and the second surface 5 meet so as to form an acute angle θ (see FIG. 2). The corner formed by the first surface 4 and the second surface 5 projects out obliquely upward.

In Embodiment 1 of the present invention, this corner portion formed by the first surface 4 and the second surface 5 functions as the temporary holders 3a to 3c. With this structure, as shown in FIG. 2, when the projecting portion 12 is placed temporarily, a portion where the first surface 4 and the second surface 5 meet is caught between the stopper 14 and the rear surface 10b (the collar 15 in the example of FIG. 2). At the same time, the stopper 14 contacts the second surface 5 and thereby is supported.

Consequently, in Embodiment 1 of the present invention, when the projecting portions 12 are placed temporarily on any of the temporary holders 3a to 3c, the projecting portions 12 are placed as if they were on rails. At this point, the display main body 10 is held relatively stably, thereby putting less burden upon the operator. Each of the notches 6 that configures the connector 2 is located adjacently to the temporary holders 3a to 3c. Therefore, after all of the projecting portions 12 are placed temporarily, the display main body 10 only needs to be shifted either to the right or the left to make the shafts 13 fit into the notches 6. Consequently, this completes hanging of the display main body on the wall. As described above, the wall-hanging operation of the display main body 10 can be performed easily according to Embodiment 1 of the present invention.

Furthermore, in Embodiment 1 of the present invention, the stopper 14 may have a tapered surface that matches with the second surface 5. With this structure, the area of contact between the stopper 14 and the second surface 5 can be enlarged, whereby a higher stability can be achieved at the time of temporary placing.

Figure 3:
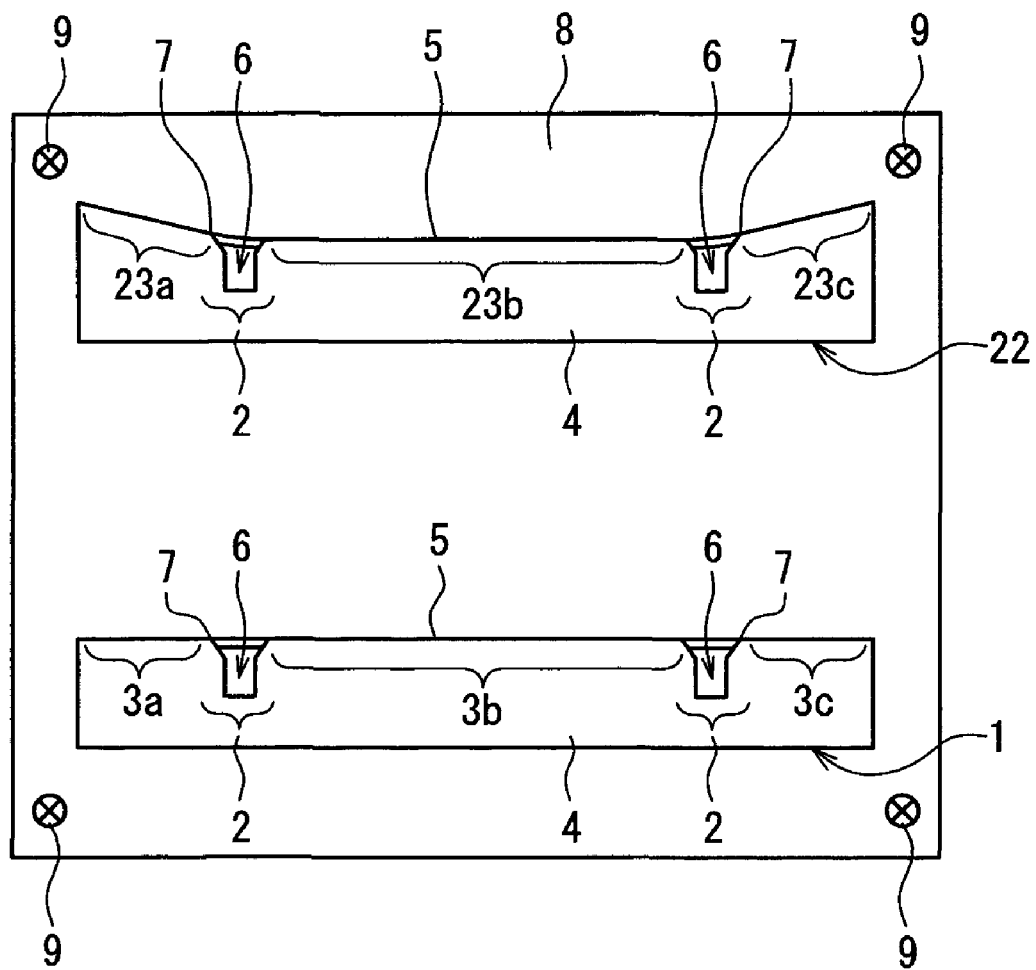
FIG. 3 is a plan view showing another example of a support member constituting the hanger according to Embodiment 1 of the present invention.

Furthermore, in Embodiment 1 of the present invention, the hanger may be the one shown in FIG. 3. FIG. 3 is a plan view showing another example of the support member constituting the hanger according to Embodiment 1 of the present invention. According to the example shown in FIG. 3, a support member 22 is mounted on the securing plate 8 in place of the support member 1 at an upper side.

As shown in FIG. 3, unlike the support member 1 shown in FIG. 1, the support member 22 is formed such that the temporary holders 23a and 23b that are located at both ends are inclined upwardly as they come closer to the ends of the support member 22 when the support member 22 is mounted on the wall surface 20. Similarly to the temporary holder 3b at the center of the support member 1, the temporary holder 23b at the center of the support member 22 is formed along a horizontal direction when the support member 22 is mounted on the wall surface 20.

Accordingly, if any one of the projecting portions 12 (see FIG. 1) is placed temporarily on the temporary holder 23a or 23c, for example, the projecting portion 12 rolls down the inclined surface of the temporary holder 23a or 23c by gravity and falls into the connector 2. When the support member 22 shown in FIG. 3 is used, the shafts 13 can be fitted into the notches 6 by taking advantage of gravity, thereby achieving a still easier wall-hanging operation.

Figure 4A:
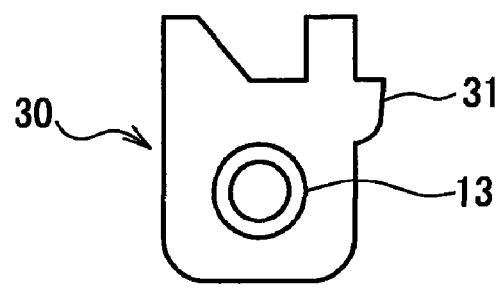
FIG. 4A is a front view showing another example of a projecting portion constituting the hanger according to Embodiment 1 of the present invention.
Figure 4B:
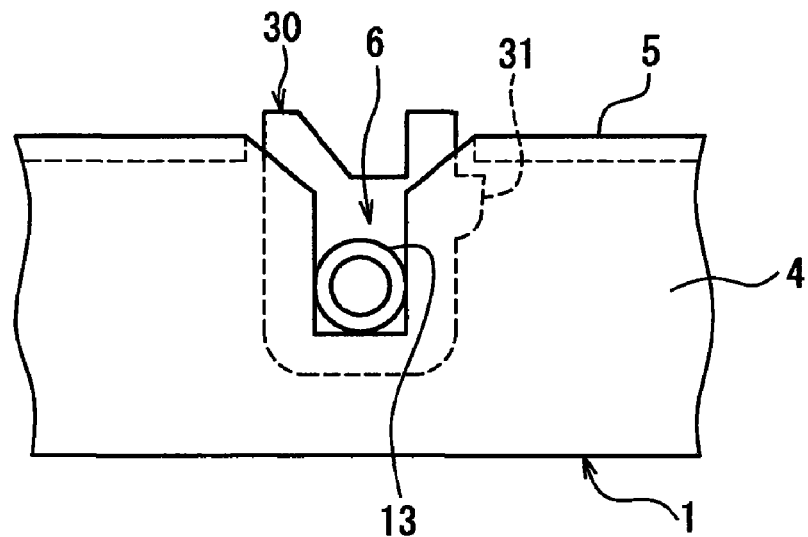
FIG. 4B is a front view when the projecting portion is mounted on the support member.
Figure 4C:
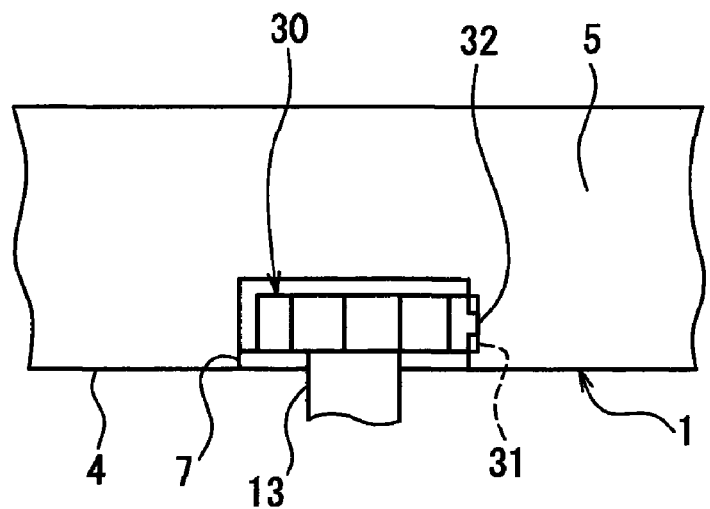
FIG. 4C is a top view when the projecting portion is mounted on the support member.

In addition, according to Embodiment 1 of the present invention, a stopper in FIG. 4 may be attached to the projecting portion 12. In FIG. 4, another example of the projecting portion that constitutes the hanger according to Embodiment 1 of the present invention is shown. In particular, FIG. 4A is a front view thereof, FIG. 4B is a front view when mounted on the support member, and FIG. 4C is a top view when mounted on the support member. In FIGS. 4A to 4C, any part of the projecting portion other than the shaft 13 and a stopper 30 is omitted.

In the example shown in FIGS. 4A to 4C, the stopper 30 is used in place of the stopper 14 shown in FIGS. 1 and 2. Unlike the stopper 14 in FIGS. 1 and 2, the stopper 30 is not rotatable. Moreover, the stopper 30 has a projection 31 on its side.

The projection 31 is formed so as to deform elastically when it comes into contact with an object coming from one direction and to interfere with an object coming from the opposite direction when it comes into contact with that object. Thus, as shown in FIGS. 4B and 4C, when the shaft 13 is fitted into the notch 6 of the support member 1, the projection 31 elastically deforms as it comes into contact with the second surface 5 and enters an inside of the support member 1. On the contrary, when an attempt is made later on to pull out the shaft 13 from a top of the notch, the projection 31 interferes with the second surface 5, thereby preventing the shaft 13 from being pulled out.

Consequently, the use of the stopper 30 shown in FIGS. 4A to 4C can prevent the shaft 13 from coming off from the notch 6. Furthermore, assuming the case where the stopper 30 needs to be detached, it is preferable that a notch 32 smaller than the stopper is provided to the second surface 5 at a position that matches the stopper 30. In this case, the stopper 30 can be detached by breaking the projection 31 with a screwdriver or the like through the notch 32.

Figure 5:
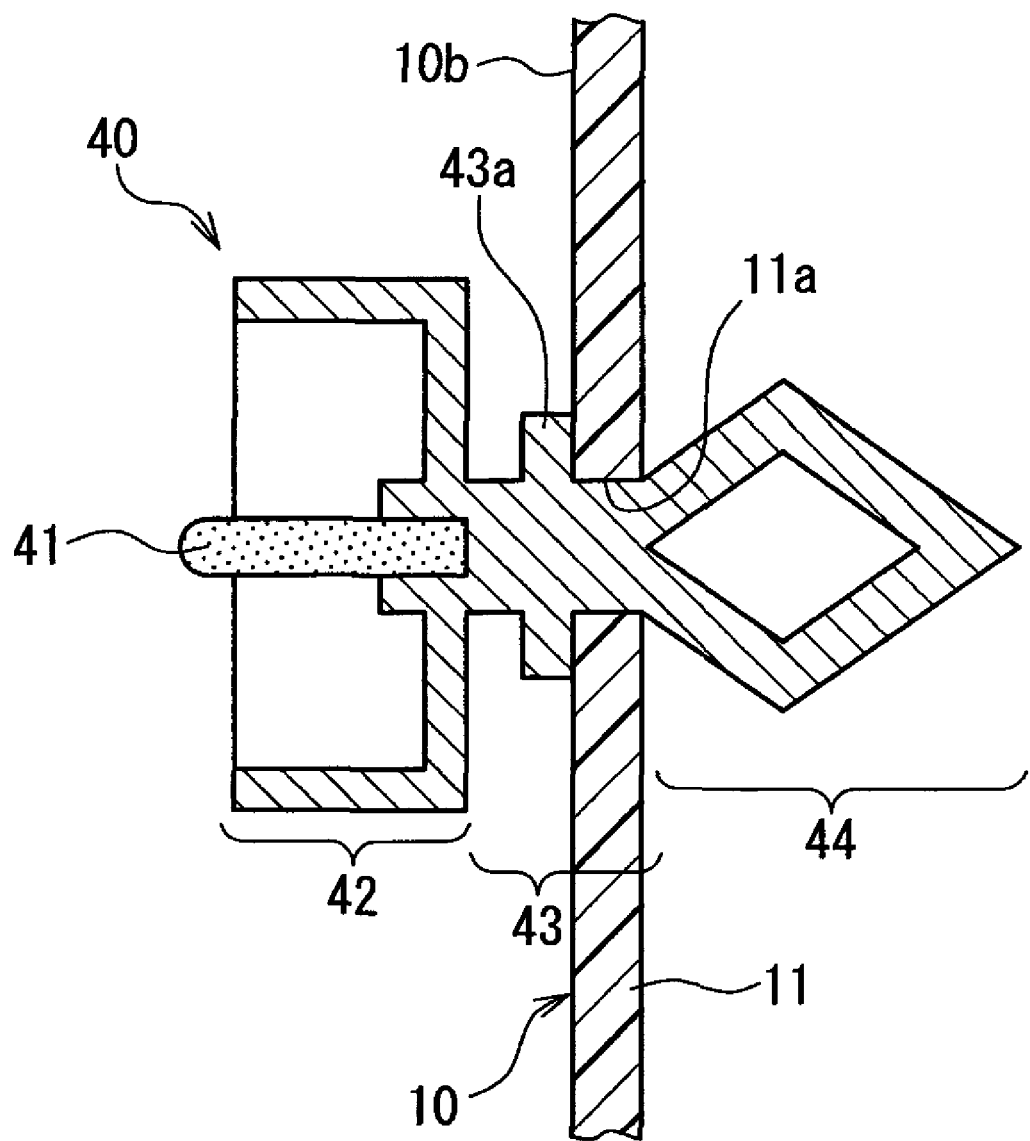
FIG. 5 is a cross-sectional view showing a marker mounted on a rear surface of a display main body.
Figure 6:
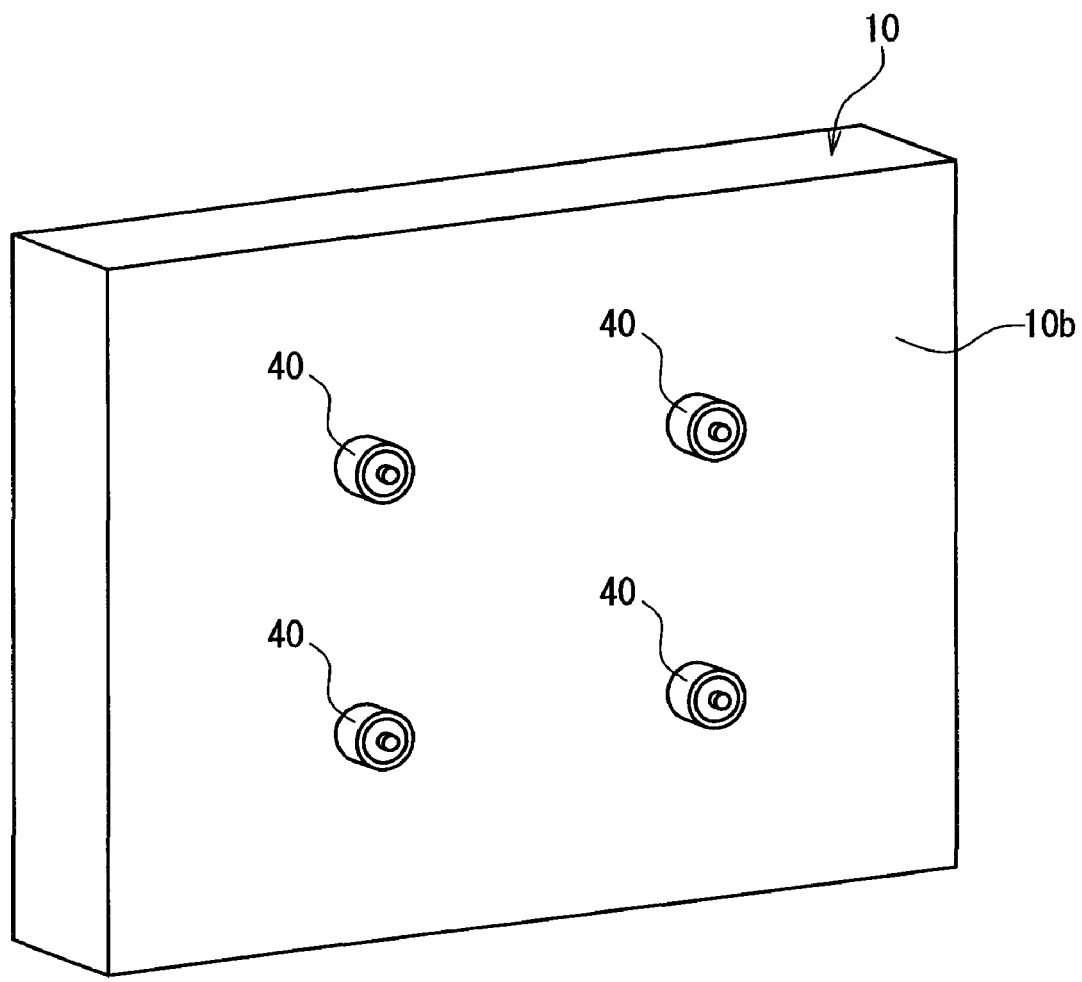
FIG. 6 is a perspective view showing the display main body to which the markers shown in FIG. 5 are mounted.

Furthermore, in the present embodiment, the securing plate 8 is used to facilitate the positioning of the support member 1 (or 22). The following mode makes it easier to position this securing plate 8 to the wall surface. This will be described with reference to FIGS. 5 and 6. FIG. 5 is a cross-sectional view showing a marker mounted on the rear surface of the display main body. FIG. 6 is a perspective view showing the display main body to which the markers shown in FIG. 5 are mounted.

As shown in FIG. 5, the marker 40 is mounted on the side wall 11 which constitutes the rear surface 10b of the display main body (see FIG. 1). The marker 40 has a tip portion 42 to which a pen 41 is attached, a main body 43 which holds the tip portion 42, and an attaching portion 44 to be joined to the side wall 11.

The pen 41 is formed of a porous material dampened with ink. The tip portion 42 has a cylinder that surrounds a periphery of the pen 41 to prevent the pen 41 from being pressed and becoming flat when the marker 40 comes into contact with the wall surface. The main body 43 has a stopper 43a, which defines the position of the marker 40. The attaching position of the marker 40 matches the position of the screw 9 (see FIG. 1) of the securing plate, as shown in FIG. 6.

Furthermore, the attaching portion 44 of the marker 40 is formed so that it can be elastically deformed and thereby inserted into an attachment hole 11a formed in the side wall 11. The attaching portion 44 expands inside the display main body to prevent the marker 40 from being detached easily. In the example of FIG. 5, the attaching portion 44 is formed into a rhombic shape and has a rhombic-shaped aperture in a center portion thereof. With such a shape, both of the easy insertion and the prevention of detachment are achieved. Moreover, the marker 40 that has become unnecessary is easily detachable.

In this way, by mounting the markers 40 as shown in FIG. 6 and performing positioning so that tips of the pens 41 touch the wall surface, the positions of screws (see FIG. 1) of the securing plate will be marked on the wall surface. Thereafter, screw holes are formed at the marked positions on the wall surface, and the securing plate is attached. As described above, with the marker 40 shown in FIGS. 5 and 6, the positioning of the securing plate on the wall surface can be performed easily.

Embodiment 2

Figure 7:
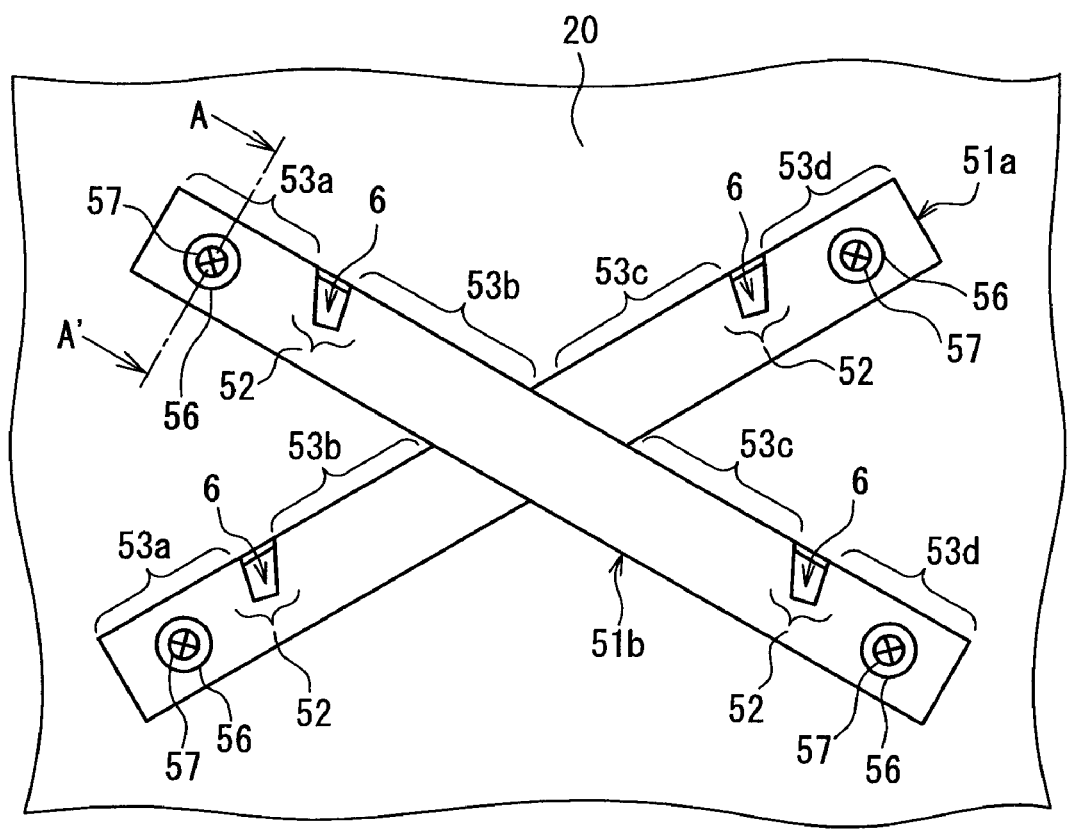
FIG. 7 is a plan view showing support members constituting a hanger according to Embodiment 2 of the present invention.

Next, a hanger and a display according to Embodiment 2 of the present invention will be described with reference to FIGS. 7 to 10. FIG. 7 is a plan view showing support members constituting the hanger according to Embodiment 2 of the present invention. FIG. 8 is an exploded perspective view showing an enlarged portion of the support members shown in FIG. 7. FIG. 9 is a cross-sectional view showing the structure of the support member shown in FIG. 7.

As shown in FIG. 7, in Embodiment 2 of the present invention, support members 51a and 51b are used in place of the support members 1 shown in FIG. 1. In Embodiment 1, two support members 1 are attached to the wall surface 20 in parallel with each other, whereas in Embodiment 2 of the present invention, the support members 51a and 51b are attached to the wall surface 20 in such a manner as to intersect each other. Furthermore, projecting portions to which the support members 51a and 51b are to be connected are similar to the ones used in Embodiment 1 (see FIGS. 1 and 2).

Figure 8A:
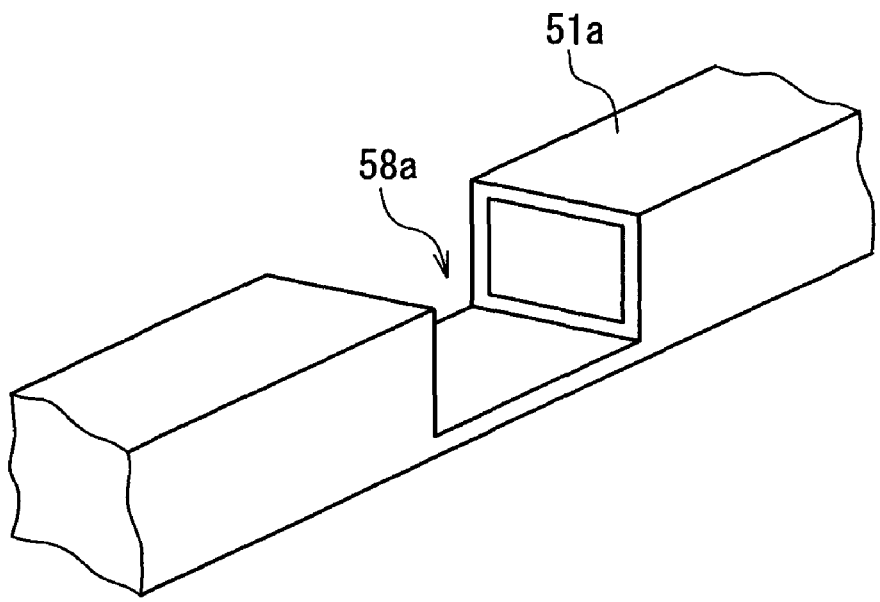
FIG. 8 is an exploded perspective view showing an enlarged portion of the support members shown in FIG. 7.
Figure 8B:
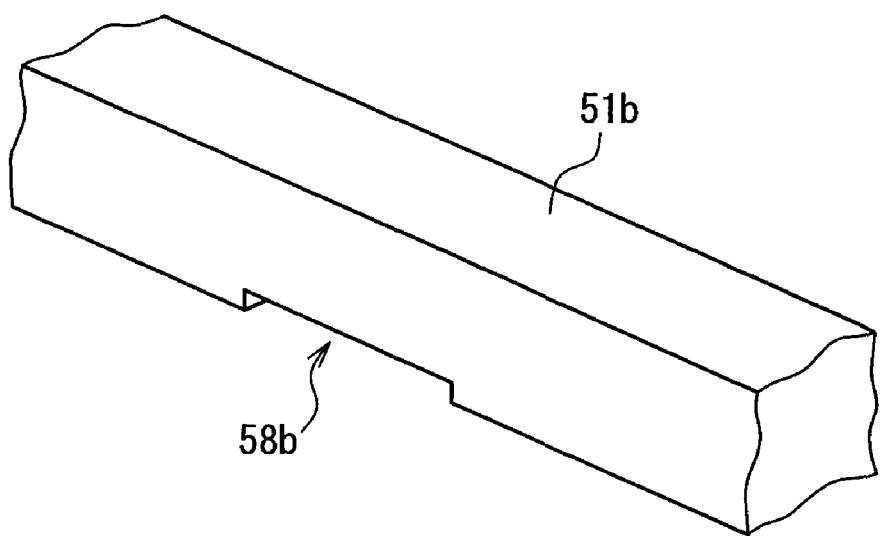
Figure 9:
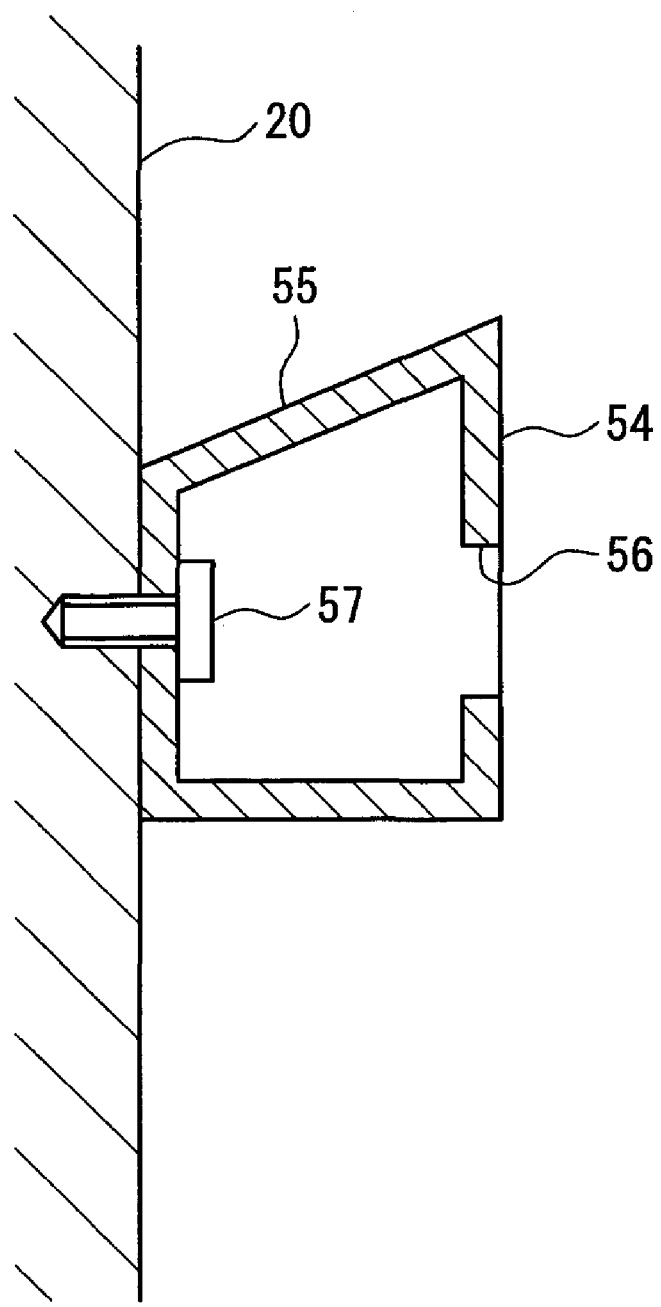
FIG. 9 is a cross-sectional view showing the structure of the support member shown in FIG. 7.

More specifically, as shown in FIGS. 8A-8B, a center portion of the support member 51a is provided with a recess 58a into which the support member 51b is to be fitted. Moreover, the support member 51b is provided with a recess 58b, so that when the support member 51b is fitted into the recess 58a of the support member 51a, the rear surfaces of these support members are flush with each other. Thus, when the support member 51b is fitted into the support member 51a, their positional relationship is fixed. Accordingly, the securing plate that is used to fix the positional relationship between the support members in Embodiment 1 is unnecessary in Embodiment 2 of the present invention. The support member 51a and the support member 51b are fixed directly to the wall surface 20.

Furthermore, as shown in FIG. 9, the support member 51a and the support member 51b are fixed to the wall surface 20 by using screws 57. In FIGS. 7 and 9, reference numeral 56 denotes through holes formed in the support member 51*a* and the support member 51*b* to attach the screws 57.

Moreover, also in Embodiment 2 of the present invention, the support member 51*a* and the support member 51*b* have prismatic shapes. Connectors 52 are formed by providing notches 6 in the support member 51*a* and the support member 51*b*. In addition, as shown in FIG. 9, also in Embodiment 2 of the present invention, the support member 51*a* and the support member 51*b* have a first surface 54 and a second surface 55 that meet so as to form an acute angle. A corner portion formed by the first surface 54 and the second surface 55 configures each of temporary holders 53*a* to 53*d*.

As described above, according to Embodiment 2 of the present invention, the effect similar to that of Embodiment 1 can be obtained with the simple structure. Therefore, it is possible to reduce the cost of the hanger according to Embodiment 2 of the present invention. Moreover, unlike Embodiment 1, the temporary holders are not formed at the center portions of the support member 51*a* and the support member 51*b* in Embodiment 2 of the present invention. Nevertheless, this will not cause a problem such as an increased burden upon the operator during the wall-hanging operation.

Also in Embodiment 2 of the present invention, the display to be hung on the wall may be a thin television receiver such as a plasma television or a liquid crystal television, or a display or the like that has no television function and is used only as a monitor, as mentioned in Embodiment 1. Furthermore, also in Embodiment 2 of the present invention, the projecting portions (see FIGS. 1 and 2) that are attached to the rear surface of the display main body, and the support member 51*a* and the support member 51*b* constitute the hanger. Moreover, the hanger and the display main body constitute the display according to Embodiment 2 of the present invention.

Figure 10:
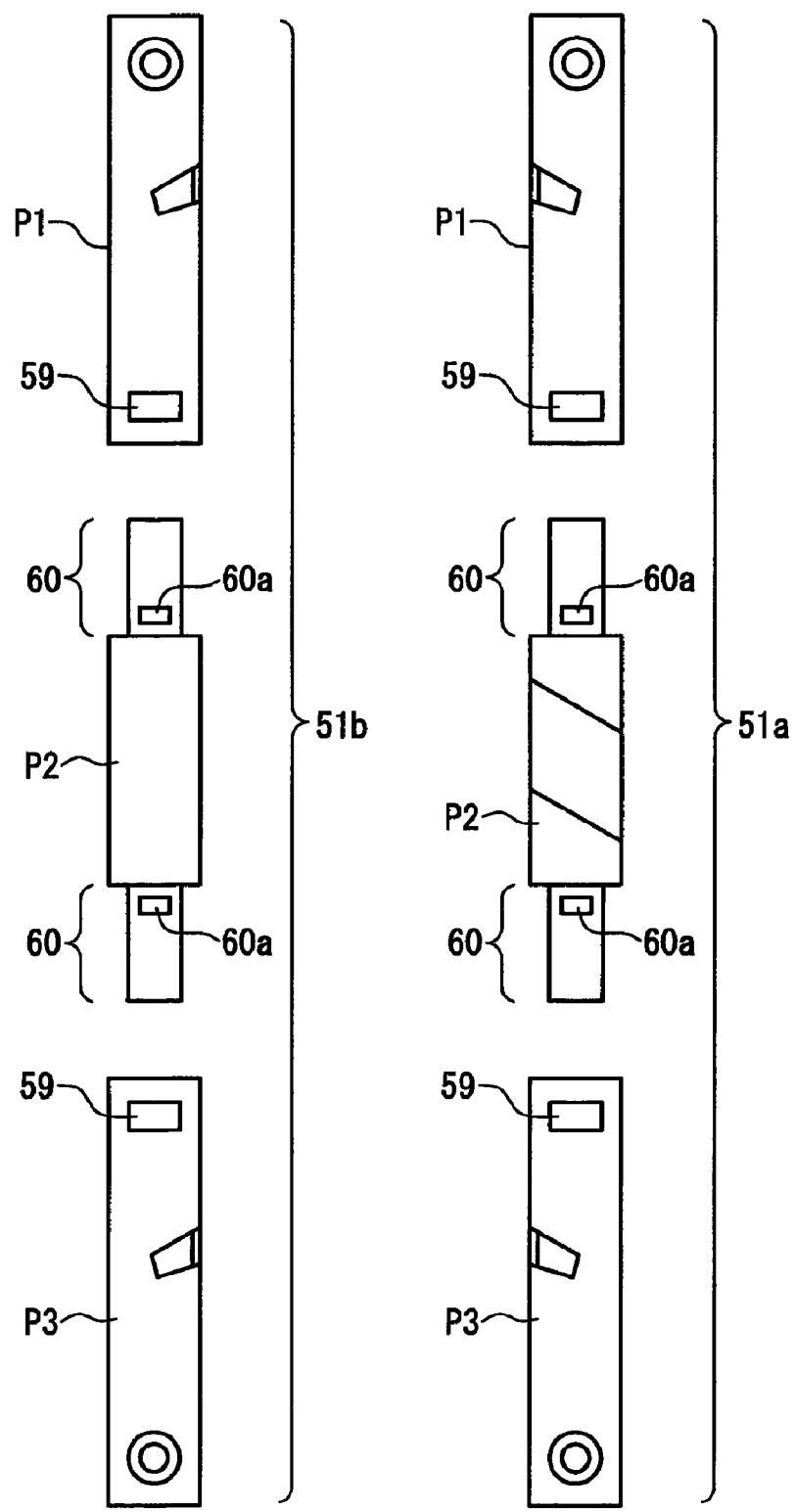
FIG. 10 is an exploded view showing an example of the case where the support members shown in FIG. 7 are of a divided type.

Furthermore, in Embodiment 2 of the present invention, the support member can be of a divided type as shown in FIG. 10. FIG. 10 is an exploded view showing an example of the case where each of the support members in FIG. 7 is of the divided type. In the example shown in FIG. 10, the support member 51*a* and the support member 51*b* are constituted by a part P1, a part P2 and a part P3, and thus can be divided into three parts, respectively.

More specifically, inserting portions 60 to be inserted into the outer parts P1 and P3 are formed at both ends of the respective center parts P2 of the support member 51*a* and the support member 51*b*. In addition, openings 59 are formed in the outer parts P1 and P3, and juts 60*a* are formed on the inserting portions 60 of the center parts P2 at positions corresponding to the openings 59.

Consequently, when the inserting portions 60 are inserted into the outer parts P1 and P3, the juts 60*a* are fitted into the corresponding openings 59, so that the parts P2 are connected with the parts P1 and the parts P3. In the case of such a divided type, the packaging can be simplified when packing the support members 51*a* and 51*b* into a display package, thereby reducing excess packaging.

Moreover, when the display main body is hung on the wall, a smaller external force is exerted to the center parts P2 than the outer parts P1 and P3. Thus, the center parts P2 can be formed with a material having a lower strength than the outer parts P1 and P3. More specifically, the center parts P2 may be formed with a resin material and the outer parts P1 and P3 may be formed with a metal material. With this mode, a reduction in the costs of manufacturing the support members 51*a* and 51*b* can be achieved.

Embodiment 3

Figure 11:
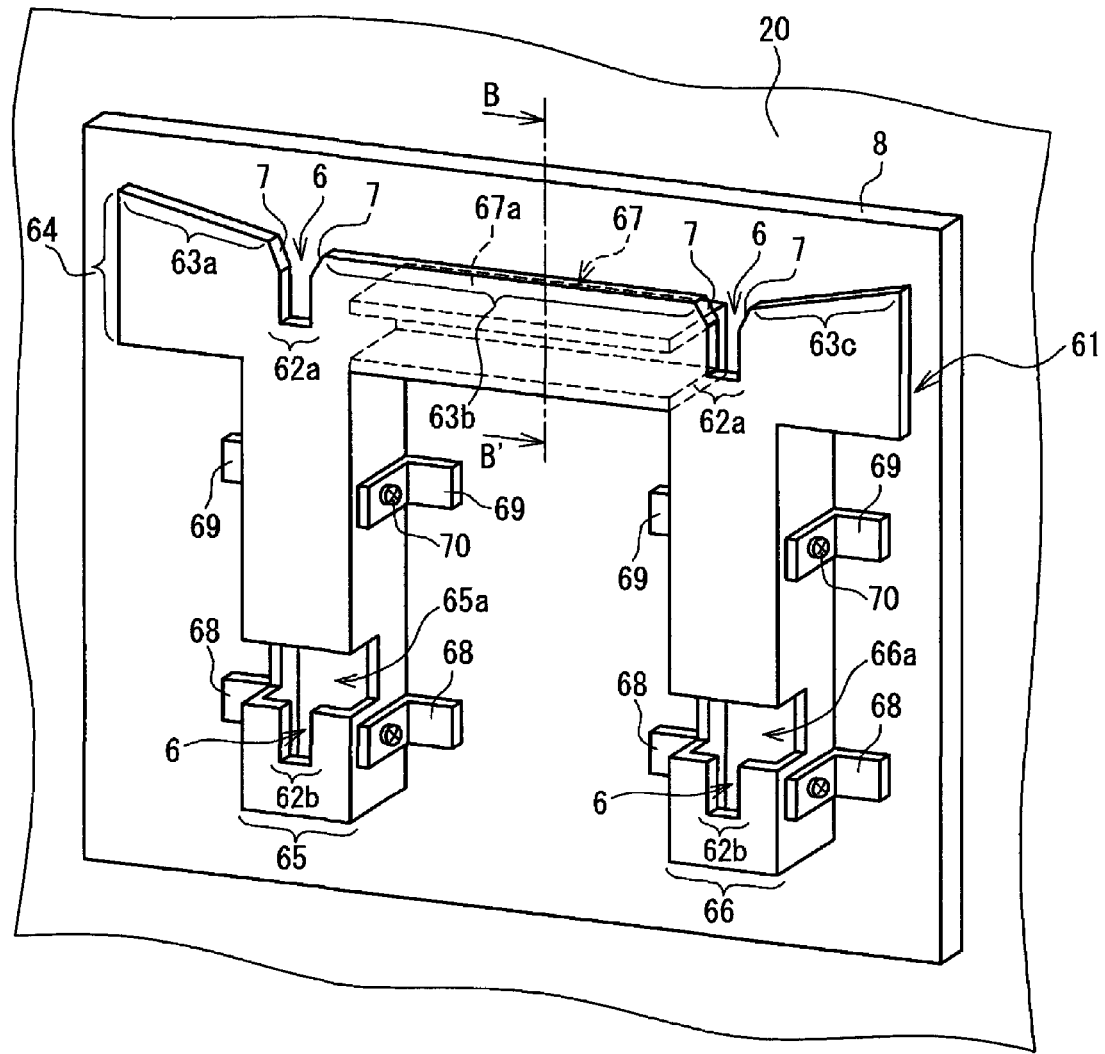
FIG. 11 is a perspective view showing a support member constituting a hanger according to Embodiment 3 of the present invention.
Figure 12:
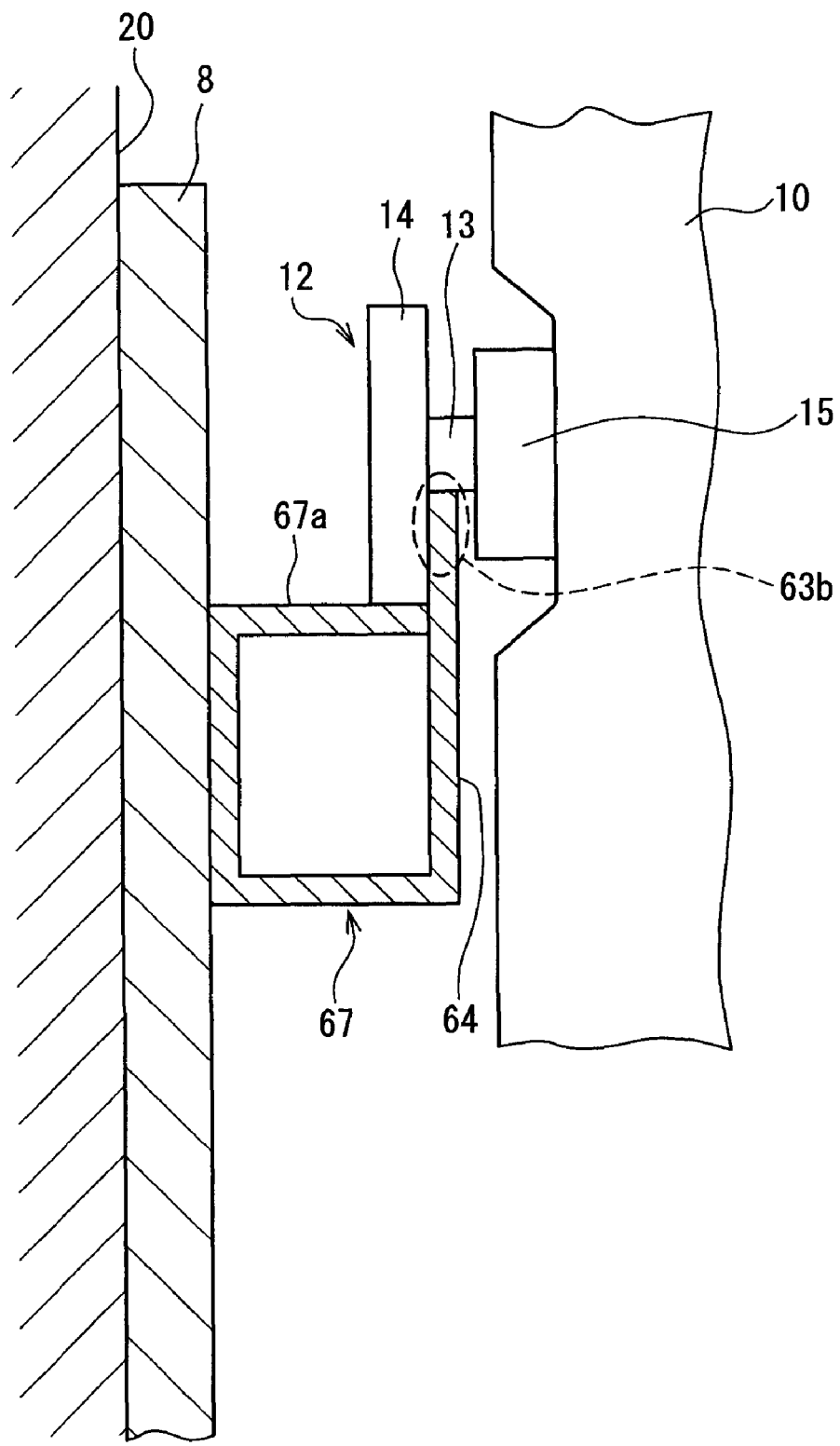
FIG. 12 is a cross-sectional view showing the structure of the support member shown in FIG. 11.
Figure 13:
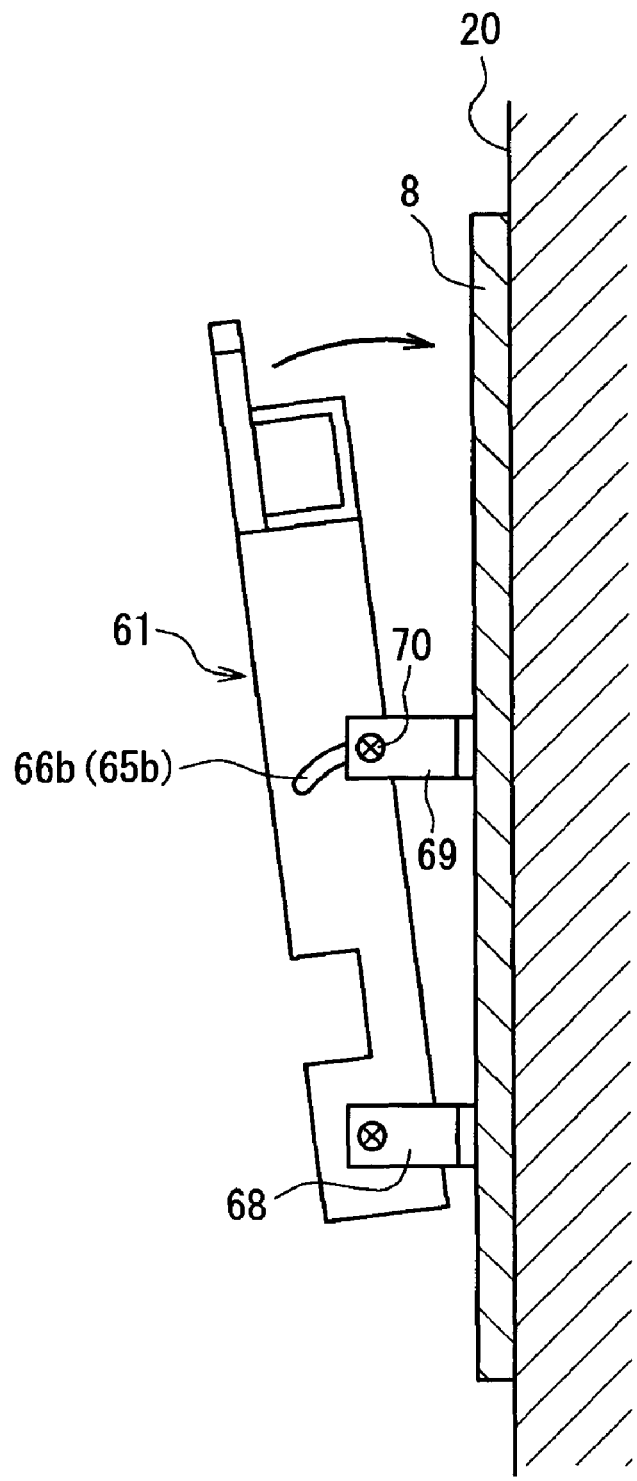
FIG. 13 is a side view showing the support member shown in FIG. 11.

Now, a hanger and a display according to Embodiment 3 of the present invention will be described with reference to FIGS. 11 to 13. FIG. 11 is a perspective view showing a support member constituting the hanger according to Embodiment 3 of the present invention. FIG. 12 is a cross-sectional view showing the structure of the support member shown in FIG. 11. FIG. 13 is a side view showing the support member shown in FIG. 11.

As shown in FIG. 11, in Embodiment 3 of the present invention, a support member 61 is used in place of the support member 1 shown in FIG. 1. The support member 61 is constituted by a portion 64 that extends in parallel with a horizontal direction and portions 65 and 66 that extend in parallel with a vertical direction when the support member 61 is fixed to the wall surface 20. The support member 61 thus has an inverted-U shape (in other words, a shape obtained by connecting two Ts that are next to each other) when viewed from a front side.

More specifically, the portion 64 is a protruding portion protruding upward, and is formed of a plate-like member. In the following, the portion 64 will be referred to as the protruding portion 64. Further, two positions of the protruding portion 64 are provided with the notch 6 similarly to Embodiment 1. This notch 6 constitutes a connector 62*a*.

Also, as shown in FIG. 12, an upper end portion of the protruding portion 64 is caught between the stopper 14 and the rear surface 10*b* (the collar 15 in the example of FIG. 12) and constitutes temporary holders 63*a* to 63*c*. Furthermore, as shown in FIGS. 11 and 12, a center portion of the protruding portion 64 on the side of the wall surface 20 is provided with a portion 67 extending out toward the wall surface 20. This portion 67 is formed so that its upper surface 67*a* contacts and supports the stopper 14. In other words, this portion 67 functions as a retaining portion that retains the stopper 14 similarly to the second surface shown in FIG. 1, and constitutes part of the temporary holder 63*b*. In the following, the portion 67 will be referred to as the retaining portion 67.

With the above structure, when the projecting portions 12 (see FIG. 12) are placed temporarily on any of the temporary holders 63*a* to 63*c*, the projecting portions 12 are placed as if they were on rails. Also, when one of the projecting portions 12 is placed temporarily on the temporary holder 63*a*, the other projecting portion 12 that is adjacent thereto in the horizontal direction is placed temporarily on the temporary holder 63*b* including the retaining portion 67. Thus, also in Embodiment 3, the display main body 10 is held relatively stably, thereby putting less burden upon the operator.

Incidentally, as shown in FIG. 11, although the protruding portion 64 is provided with the temporary holders 63*a* to 63*c*, the portions 65 and 66 are not provided with any temporary holders. Thus, it is difficult to place temporarily the projecting portions 12 that are provided on a lower side in the rear surface of the display main body. However, since the support member 61 entirely can be tilted as shown in FIG. 13 in Embodiment 3 of the present invention, only the upper projecting portions 12 need to be placed temporarily. This will be explained below.

As shown in FIG. 11, the portions 65 and 66 are formed so as to extend vertically downwardly from the protruding portion 64, and function as supporting portions that support the protruding portion 64. Hereinafter, the portions 65 and 66 are referred to as the supporting portions. The supporting portions 65 and 66 are formed by bending a plate-like member into a U shape. Also, the plate-like member is made as one piece with the plate-like member constituting the protruding portion 64. Furthermore, front surfaces of the supporting portions 65 and 66 respectively are provided with openings 65*a* and 66*b* into which the projecting portions 12 are to be fitted and notches 6 constituting connectors 62.

Moreover, as shown in FIGS. 11 and 13, the supporting portions 65 and 66 are fixed to the securing plate with fastening fixtures 68, and the fastening fixtures 68 and the supporting portions 65 and 66 are connected using spindles. Accordingly, as shown in FIG. 13, at the time of a wall-hanging operation, the upper portion of the support member 61 can be tilted toward the operator.

Thus, in Embodiment 3 of the present invention, only the upper projecting portions 12 of the projecting portions 12 provided on a back surface of the display main body need to be placed temporarily. In other words, after the upper projecting portions 12 are placed temporarily, they are fitted into the notches 6, and then the support member 61 is raised gradually. In this way, the lower projecting portions 12 are connected automatically to the lower connectors 62b, thus completing the wall-hanging operation.

When the support member 61 rises completely, it is fixed to that position with fastening fixtures 69. More specifically, in the example of FIG. 11, the fastening fixtures 69 are attached above the fastening fixtures 68 in the securing plate 8. Also, sides of each of the supporting portions 65 and 66 are provided with openings (arc-shaped elongated holes 65b and 66b) corresponding to the fastening fixtures 69. The support member is fixed using the fastening fixtures 69 by sandwiching the fastening fixture 69 and a periphery of the portion provided with the elongated holes 65b (or 66b) between a bolt 70 and a nut (not shown). It should be noted that, in Embodiment 3 of the present invention, the fastening fixtures 69 also can be fixed by other methods without any particular limitation.

As described above, Embodiment 3 of the present invention also makes it simpler to hang the display main body on the wall without placing a heavy burden upon an operator, similarly to Embodiment 1.

Embodiment 4

Figure 14:
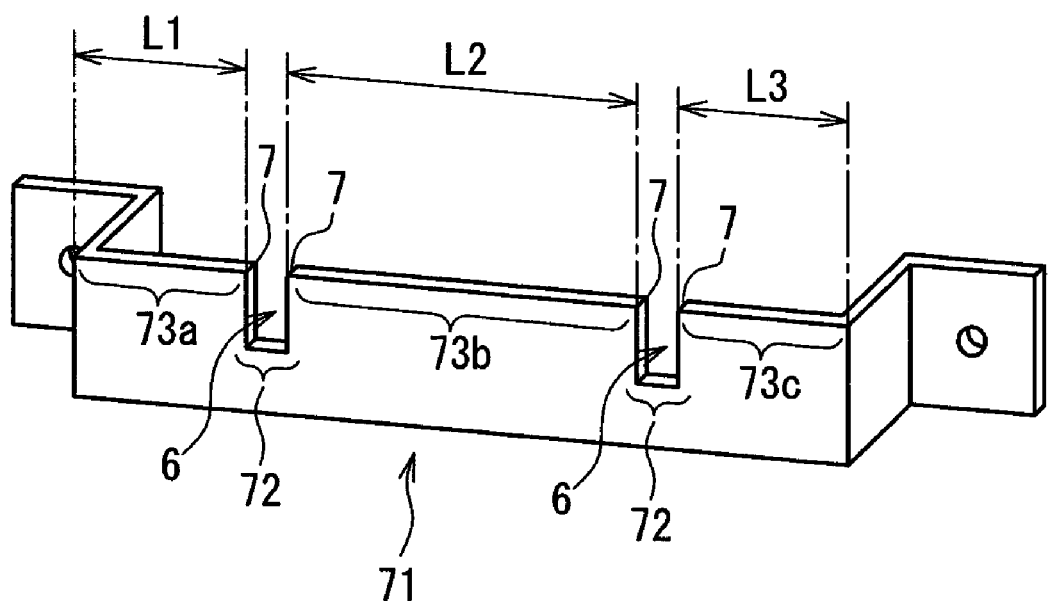
FIG. 14 is a perspective view showing a support member constituting a hanger according to Embodiment 4 of the present invention.
Figure 15:
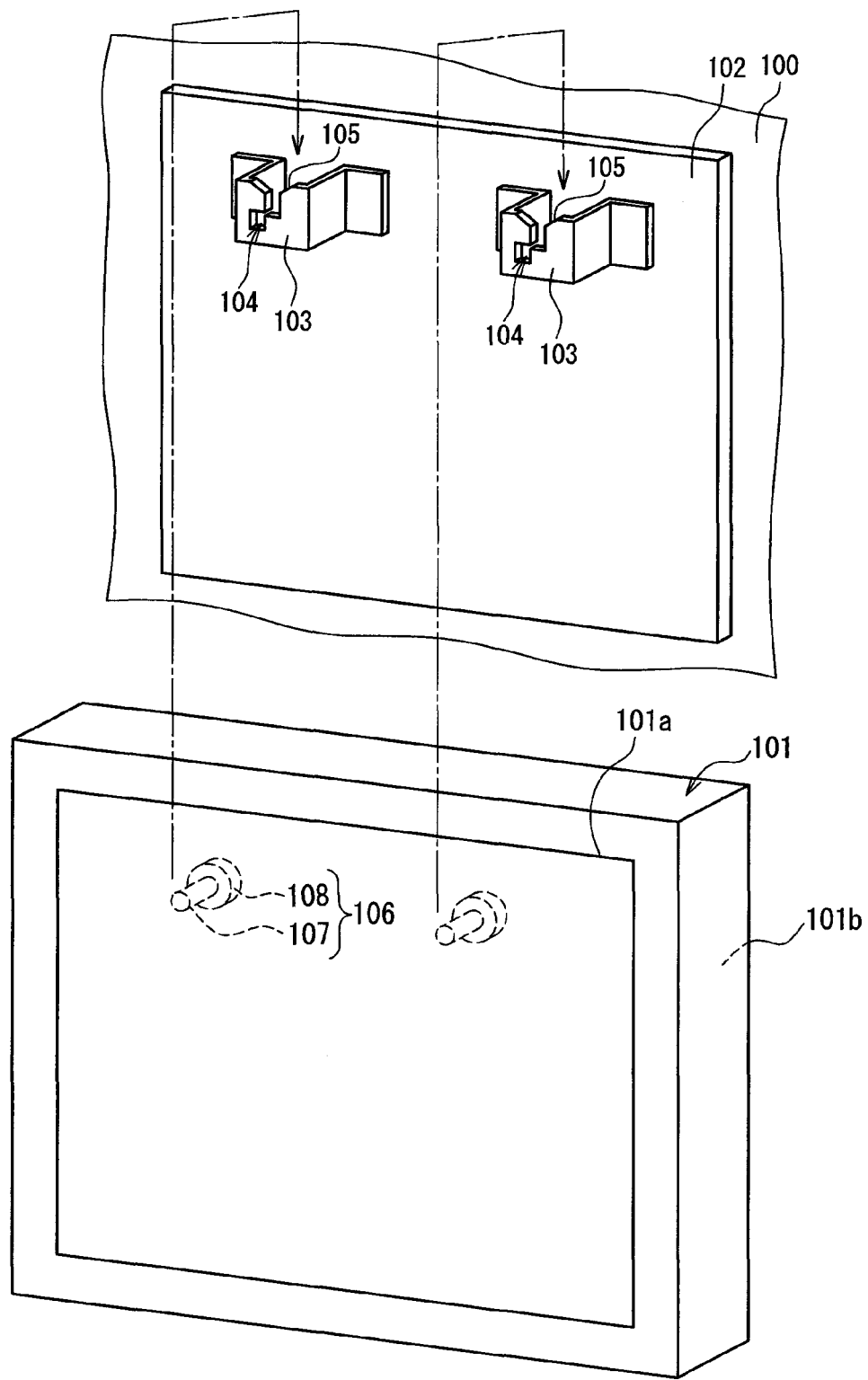
FIG. 15 is a perspective view showing a conventional hanger.

Now, a hanger and a display according to Embodiment 4 of the present invention will be described with reference to FIG. 14. FIG. 14 is a perspective view showing a support member constituting the hanger according to Embodiment 4 of the present invention.

As shown in FIG. 14, in Embodiment 4 of the present invention, a support member 71 is used in place of the support member 1 shown in Embodiment 1. The support member 71 is formed by bending a plate-like member. Also, notches 6 provided at two positions of the support member 71 constitute connectors that are to be connected to the projecting portions provided on the rear surface of the display main body.

Further, in Embodiment 4 of the present invention, an upper end portion of the support member 71 constitutes temporary holders 73a to 73c. However, if the horizontal length of the upper end portion of the support member 71 is too small, temporary placing becomes difficult. Thus, the lengths from opening edges of the notches 6 to edges of the upper end portion constituting the temporary holders 73a to 73c, namely, the lengths L1, L2 and L3 in FIG. 14 are defined so as to allow the temporary placing of the projecting portions 12.

L1 indicates the length from the opening edge of the left notch 6 in the figure to the edge of the upper end portion constituting the temporary holder 73a. L2 indicates the length from the opening edge of the left notch 6 in the figure to the edge of the upper end portion constituting the temporary holder 73b (the opening edge of the right notch 6 in the figure). L3 indicates the length from the opening edge of the right notch 6 in the figure to the edge of the upper end portion constituting the temporary holder 73c.

More specifically, it is appropriate that L1, L2 and L3 be set to be at least 1/10 times, preferably 1/8 to 1/6 times, as large as the horizontal length of the display screen of the display.

As described above, in Embodiment 4 of the present invention, although the temporary holders 73a to 73c are formed only of the portion to be caught between the stopper and the rear surface of the display main body (see FIGS. 1 and 2), they have a horizontal length sufficient to allow the temporary placing of the projecting portions 12. Accordingly, Embodiment 4 of the present invention also makes it simpler to hang the display main body on the wall without placing a heavy burden upon an operator, similarly to Embodiment 1.

In the present invention, the projecting portions provided on the rear surface of the display main body are not limited to those illustrated in Embodiments 1 to 4. The stopper or the shaft of the projecting portions in the present invention also may have a cross-section with any shape other than the circular shape. Further, the stopper and the shaft may be formed as one piece, and it also may be possible to adopt the mode in which the gap between the rear surface of the display main body and the stopper is present only on the lower side.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hanger for hanging a display main body on a wall, comprising:
    a projecting portion that is attached to a rear surface of the display main body; and
    a longitudinal bar-shaped support member that is to be fixed to a wall surface and connected to the projecting portion so as to support the display main body;
    wherein the projecting portion comprises a shaft that sticks out from the rear surface and a stopper that is attached to a tip of the shaft, and the stopper is formed to have a larger cross-section than the shaft,
    the longitudinal bar-shaped support member comprises
        a first surface to be opposed to the display main body,
        a second surface that forms an acute angle with the first surface and extends from an upper end of the first surface to the wall surface,
        a third surface that is attached to the wall surface,
        a fourth surface that is arranged between the first surface and the third surface,
        a plurality of connectors each of which is formed by a notch continuously formed in the first surface and the second surface and is connectable to the projecting portion, and
        a temporary holder that is a region of a corner portion formed by the first surface and the second surface between the connectors and configured to hold the projecting portion temporarily,
    the notch in the first surface is larger than a cross-section of the shaft and smaller than a cross-section of the stopper,
    the notch in the second surface is larger than the cross-section of the stopper, and
    the temporary holder is formed so as to be caught between the stopper and the rear surface when the projecting portion is placed temporarily.

2. The hanger according to claim 1, wherein the temporary holder comprises a plate-like protruding portion and a retaining portion that retains the stopper, the plate-like protruding portion is formed so that its end portion is caught between the stopper and the rear surface, and the retaining portion comprises a surface that contacts the stopper.

3. The hanger according to claim 1, wherein an end portion of the support member on a side provided with the opening of the notch constitutes the temporary holder, and the length from an edge of the opening of the notch to an edge of the end portion constituting the temporary holder is set to be at least 1/10 times as large as a horizontal length of a display screen of the display.

4. The hanger according to claim 1, wherein an end portion of the support member on a side provided with the opening of the notch constitutes the temporary holder, and the length from an edge of the opening of the notch to an edge of the end portion constituting the temporary holder is set to be at least 1/10 times as large as a horizontal length of a display screen of the display.

5. A display comprising:

a display main body; and a hanger for hanging the display main body on a wall;

wherein the hanger comprises a projecting portion that is attached to a rear surface of the display main body, and a longitudinal bar-shaped support member that is to be fixed to a wall surface and connected to the projecting portion so as to support the display main body, the projecting portion comprises a shaft that sticks out from the rear surface and a stopper that is attached to a tip of the shaft, and the stopper is formed to have a larger cross-section than the shaft, the longitudinal bar-shaped support member comprises a first surface to be opposed to the display main body, a second surface that forms an acute angle with the first surface and extends from an upper end of the first surface to the wall surface, a third surface that is attached to the wall surface, a fourth surface that is arranged between the first surface and the third surface, a plurality of connectors each of which is formed by a notch continuously formed in the first surface and the second surface and is connectable to the projecting portion, and a temporary holder that is a region of a corner portion formed by the first surface and the second surface between the connectors and configured to hold the projecting portion temporarily, the notch in the first surface is larger than a cross-section of the shaft and smaller than a cross-section of the stopper, the notch in the second surface is larger than the cross-section of the stopper, and the temporary holder is formed so as to be caught between the stopper and the rear surface when the projecting portion is placed temporarily.

6. The display according to claim 5, wherein the temporary holder comprises a plate-like protruding portion and a retaining portion that retains the stopper, the plate-like protruding portion is formed so that its end portion is caught between the stopper and the rear surface, and the retaining portion comprises a surface that contacts the stopper.

7. The display according to claim 5, wherein an end portion of the support member on a side provided with the opening of the notch constitutes the temporary holder, and the length from an edge of the opening of the notch to an edge of the end portion constituting the temporary holder is set to be at least 1/10 times as large as a horizontal length of a display screen of the display.

8. The display according to claim 5, wherein an end portion of the support member on a side provided with the opening of the notch constitutes the temporary holder, and the length from an edge of the opening of the notch to an edge of the end portion constituting the temporary holder is set to be at least 1/10 times as large as a horizontal length of a display screen of the display.

* * * * *